United States Patent [19]

Akashi et al.

[11] Patent Number: 4,800,410
[45] Date of Patent: Jan. 24, 1989

[54] FOCUS DETECTING APPARATUS FOR SELECTING THE OPERATING PROCESS IN CONFORMITY WITH THE CONTRAST OF AN OBJECT

[75] Inventors: Akira Akashi; Akira Ishizaki; Yasuo Suda, all of Yokohama; Ichiro Ohnuki, Tokyo; Keiji Ohtaka, Tokyo; Takeshi Koyama, Tokyo, all of Japan

[73] Assignee: Canon Kabushiki Kaisha, Tokyo, Japan

[21] Appl. No.: 70,382

[22] Filed: Jul. 7, 1987

[30] Foreign Application Priority Data

Jul. 10, 1986 [JP] Japan .................. 61-160823

[51] Int. Cl.$^4$ .................. G03B 3/00; G01J 1/20
[52] U.S. Cl. .................. 354/408; 250/201; 250/204
[58] Field of Search .............. 354/402, 406, 407, 408, 354/409; 250/201 R, 201 PF, 204

[56] References Cited

U.S. PATENT DOCUMENTS

| | | | |
|---|---|---|---|
| 4,333,007 | 6/1982 | Langlais et al. | 354/402 |
| 4,559,446 | 12/1985 | Suzuki | 354/408 |
| 4,561,749 | 12/1985 | Utagawa | 354/406 |
| 4,618,236 | 10/1986 | Akashi et al. | 354/406 |
| 4,636,624 | 1/1987 | Ishida et al. | 354/406 X |

Primary Examiner—W. B. Perkey
Attorney, Agent, or Firm—Fitzpatrick, Cella, Harper & Scinto

[57] ABSTRACT

A focus detecting apparatus in which light distributions having their relative positional relation varying in conformity with the focus adjusted state of an objective optical system and based on an object are received by a light-receiving device having a plurality of picture elements and the output signal of the light-receiving device is operated in two different processes, and an evaluated values dependent on the contrast is operated in each of the processes and the evaluated values are compared with each other, and the result calculated in the process of better contrast is adopted as a value indicative of the focus adjusted state of the objective optical system.

8 Claims, 10 Drawing Sheets

FIG. 13(a)    FIG. 13(b)    FIG. 13(c)
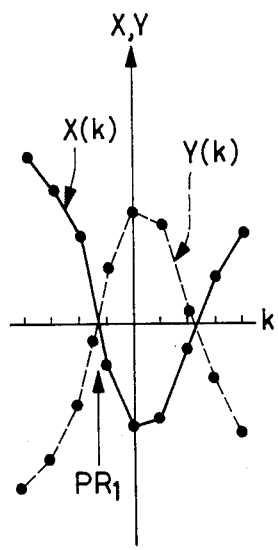
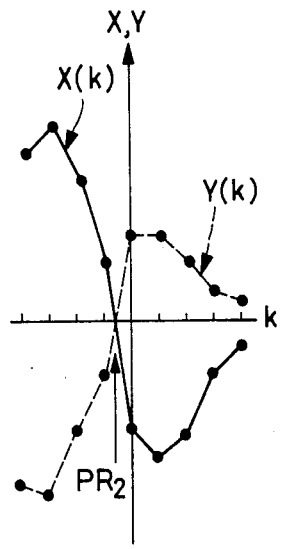
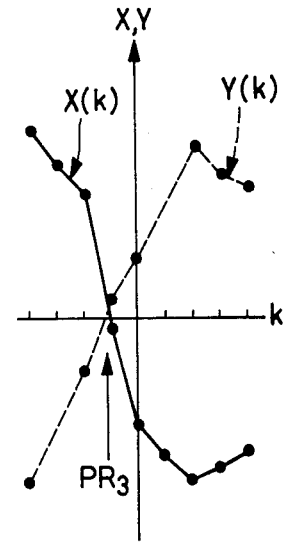
FIG. 15
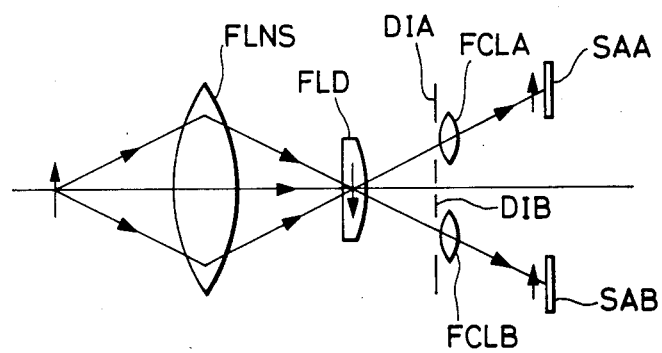

FOCUS DETECTING APPARATUS FOR SELECTING THE OPERATING PROCESS IN CONFORMITY WITH THE CONTRAST OF AN OBJECT

BACKGROUND OF THE INVENTION

1. Field of the Invention

This invention relates to improvements in a focus detecting apparatus for detecting the focus state from the relative positional relationship between the two images of an object.

2. Related Background Art

As one type of the focus detecting apparatus of a camera, there is known the so-called "image deviation type" in which the exit pupil of the photo-taking lens is divided and the relative positional displacement of a pair of images formed by light beams passed through the pupil areas is observed to thereby discriminate the in-focus state.

The focus detecting method in the apparatus of this type will hereinafter be described with reference to FIG. 15 of the accompanying drawings A field lens FLD is disposed coaxially with a photo-taking lens FLNS whose focus is to be detected Disposed behind the field lens and at positions symmetric with respect to the optic axis are two secondary imaging lenses FCLA and FCLB. Further rearwardly of the secondary imaging lenses, there are disposed sensor rows SAA and SAB to sense visible or invisible images. Diaphragms DIA and DIB are provided near the secondary imaging lenses FCLA and FCLB. The field lens FLD substantially images the exit pupil of the photo-taking lens FLNS on the pupil surfaces of the two secondary imaging lenses FCLA and FCLB. As a result, light beams entering the secondary imaging lenses FCLA and FCLB are those emitted from regions of an equal area on the exit pupil surface of the photo-taking lens FLNS which correspond to the secondary imaging lenses FCLA and FCLB and do not overlap each other. When aerial images formed near the field lens FLD are re-imaged on the surface of the sensor rows SAA and SAB by the secondary imaging lenses FCLA and FCLB, the two images on the sensor rows SAA and SAB change their positions on the basis of the displacement of the positions of the aerial images in the direction of the optic axis. Accordingly, if the displacement (deviation) of the relative position of the two images is detected, the focus state of the photo-taking lens FLNS can be known. The signal processing method for detecting the amount of image deviation from the image signals output from the sensor rows SAA and SAB is disclosed by the applicant in Japanese Laid-Open Patent Application No. 142306/1983 (corresponding to U.S. Pat. No. 4,559,446), Japanese Laid-Open Patent Application No. 107313/1984 and Japanese Laid-Open Patent Application No. 101513/1985 (corresponding to U.S. Pat. No. 4,618,236). Specifically, when the number of picture elements constituting the sensor row SAA or SAB is N and the image signals from the first $(i=0, \ldots, N-1)$ sensor rows SAA, SAB are A(i) and B(i), the following equation is operated with respect to $k_1 \leq k \leq k_2$:

$$X(k) = \sum_{i=0}^{M-1} \max\{A(i), B(i + |k| + 1)\} - \sum_{i=0}^{M-1} \max \quad (1)$$
$$\{A(i + 1), B(i + |k|)\}(k < 0)$$
$$= \sum_{i=0}^{M-1} \max\{A(i + k), B(i + 1)\} - \sum_{i=0}^{M-1} \max$$
$$\{A(i + k + 1), B(i)\}(k \geq 0)$$
$$= X_1(k) - X_2(k)$$

$$Y(k) = \sum_{i=0}^{M-1} \min\{A(i), B(i + |k| + 1)\} - \sum_{i=0}^{M-1} \min \quad (2)$$
$$\{A(i + 1), B(i + |k|)\}(k < 0)$$
$$= \sum_{i=0}^{M-1} \min\{A(i + k), B(i + 1)\} - \sum_{i=0}^{M-1} \min$$
$$\{A(i + k + 1), B(i)\}(k \geq 0)$$
$$= Y_1(k) - Y_2(k)$$

M is the number of operation picture elements represented by $(M=N-|k|-1)$, k is called the amount of relative displacement, and $k_1$ and $k_2$ are often assumed as $-N/2$ and $N/2$. The operation max{a, b} represents the extraction of the greater one of a and b, and the operator min{a, b} represents the extraction of the smaller one of a and b. Accordingly, the terms $X_1(k)$, $X_2(k)$, $Y_1(k)$ and $Y_2(k)$ in equations (1) and (2) above can be regarded as the amounts of correlation in a broad sense. Further, examining equations (1) and (2) in detail, $X_1(k)$ and $Y_1(k)$ in reality represent the amounts of correlation in $(k-1)$ displacement as defined above, and $X_2(k)$ and $Y_2(k)$ represent the amounts of correlation in $(k+1)$ displacement. Therefore, the evaluated amount X(k) which is the difference between $X_1(k)$ and $X_2(k)$ means the amount of variation in the amount of correlation of the image signals A(i) and B(i) in the amount of relative displacement k.

The amounts of correlation $X_1(k)$ and $X_2(k)$ are smallest when the correlation between the two images is highest, as is apparent from the above definition. Consequently, X(k) which is the amount of variation therein should be "0" and the inclination thereof should be negative when the correlation is highest. However, X(k) is scattered data and therefore, actually, on the assumption that $$X(kp) \geq 0, X(kp+1) < 0 \quad (3)$$

and that the peak of the amount of correlation exists in the section [kp, kp+1] of relative displacement wherein $X(kp) - X(kp+1)$ is greatest, by effecting an interpolating operation $$PR = kp + \frac{X(kp)}{X(kp) - X(kp + 1)}, \quad (4)$$

the amount of image deviation PR below the picture element unit can be detected.

Conversely to $X_1(k)$ and $X_2(k)$, the amounts of correlation $Y_1(k)$ and $Y_2(k)$ become greatest from the foregoing definition when the correlation between the two images is highest. Consequently, Y(k) which is the amount of variation therein should be "0" and the inclination thereof should be positive when the correlation is highest. As regards Y(k) also, like X(k), when $$Y(kp) \leq 0, Y(kp+1) > 0 \quad (6)$$

and $Y(kp) - Y(kp+1)$ is greatest, by effecting an interpolating operation of $$PR = kp + \left| \frac{X(kp)}{X(kp) - X(kp+1)} \right|, \quad (7)$$

the amount of image deviation PR below the picture element unit can be detected.

Now, any of the focus evaluated amounts $X(k)$ and $Y(k)$ which can be found in the manner described above can be used to detect the amount of image deviation PR. However as disclosed in U.S. Pat. No. 4,618,236, there is superiority or inferiority in terms of S/N between the two depending on the signal pattern of an object to be photographed. In the embodiment proposed in U.S. Pat. No. 4,618,236, the determination as to whether the means on the side which operates the focus evaluated amount $X(k)$ or the means on the side which operates the focus evaluated amount $Y(k)$ should be selected in conformity, for example, with the magnitudes of the image signals of the end portions in the operation range (the levels of the image signals from each two picture elements in the end portions) is effected (actually, when the levels of the image signals of the end portions are small, the means which operates $Y(k)$ is selected, and when the levels of the image signals of the end portions are great, the means which operates $X(k)$ is selected), and the amount of image deviation PR is found on the basis of the focus evaluated amount output from one of said two means. Thereby, the reduction in the focus detection accuracy for a special signal pattern caused when the apparatus is constituted by only the one operation means can be eliminated, and the apparatus can be said to be a very effective apparatus. In the aforementioned proposal, "the image signals of the end portions" are the image signals of the end portions when the relative displacement thereof is "k=0", and the end portions to be operated vary from the fact that the range of operation becomes different depending on the amount of relative displacement k. Consequently, it could not always be said that during the other time than when the relative displacement was "k=0" (near the in-focus), the means superior in terms of S/N was selected, that is, the amount of image deviation was found by the focus evaluated amount superior in terms of S/N.

SUMMARY OF THE INVENTION

It is a first object of the present invention to solve the above-noted problems and to provide a focus detecting apparatus which can accomplish focus detection with good accuracy even when the deviation of the relative position of two images is great.

It is a second object of the present invention to change the signal processing process in conformity with the form of the brightness distribution of an object and accomplish focus detection of good accuracy.

BRIEF DESCRIPTION OF THE DRAWINGS

FIGS. 13(a)-13(c) show a variation in the evaluated amount.

FIG. 15 shows the arrangement of the optical system of a popular secondary imaging type focus detecting apparatus.

DESCRIPTION OF THE PREFERRED EMBODIMENT

Figure 1:
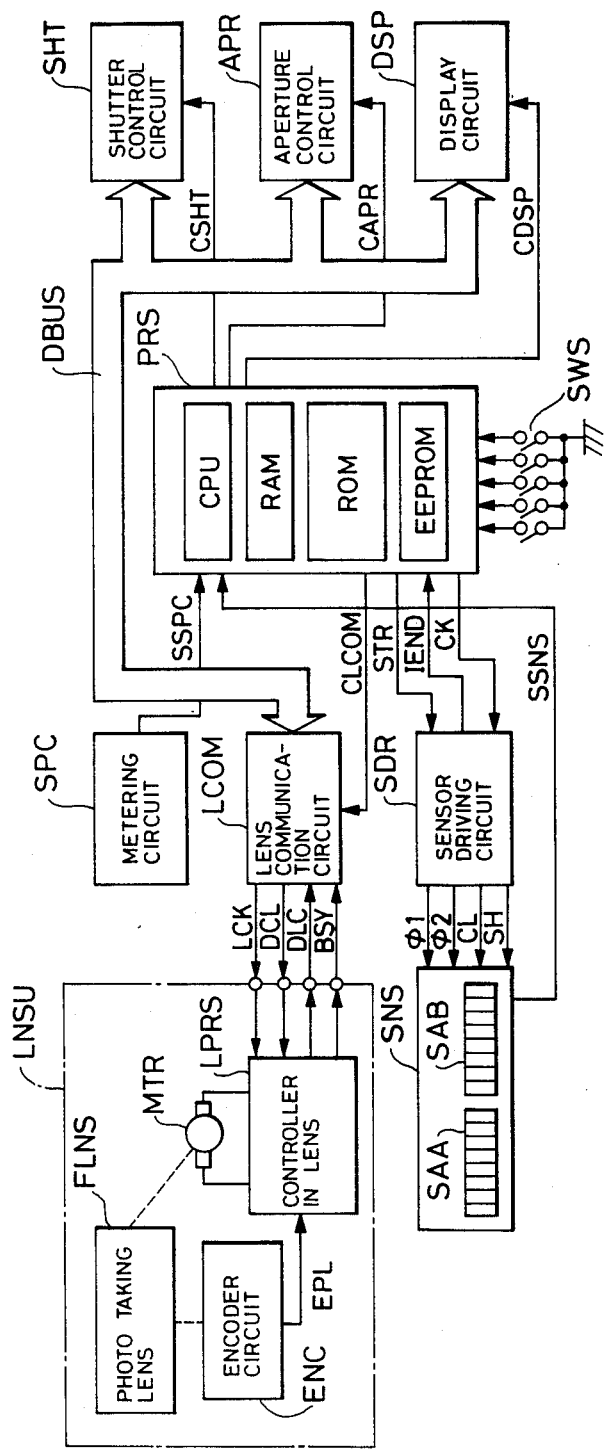
FIG. 1 is a block diagram showing an example of the focus detecting apparatus of a camera which is suitable for carrying out the present invention.

The invention will hereinafter be described in detail with respect to an embodiment thereof illustrated in the drawings. Although the features of the present invention are particularly well represented at steps 130–146 of the flow chart of FIG. 6, the basic construction will first be described herein.

FIG. 1 is a block diagram showing an example of the focus adjusting apparatus of a camera which is suitable for carrying out the present invention. PRS designates the control circuit of the camera which is a one-chip microcomputer in which are disposed CPU (central processing unit), RAM, ROM, EEPROM (electrically erasable programmable ROM), input/output ports and an analog input port with A/D converting function. Software for controlling the sequence, AF (auto-focus) and AE (auto-exposure) of the camera are stored in the ROM, and parameters necessary for the control of AF and AE are stored in the EEPROM. SHT denotes a shutter control circuit which receives data input through a data bus DBUS while a control signal CSHT is input from the control circuit PRS, and controls the movement of forward and rearward shutter curtains, not shown, on the basis of said data, APR designates an aperture control circuit which receives data input through the data bus DBUS while a control signal CAPR is input, and controls an aperture mechanism, not shown, on the basis of said data, DSP denotes a display circuit which receives data input through the data bus DBUS while a control signal CDSP is input, and displays various types of photographing information on the basis of said data, and SWS designates a group of switches disposed outside and inside the camera such as a release switch, not shown, and switches for setting various types of information such as the shutter and aperture.

SPC denotes a metering circuit An analog metering signal SSPC which is the output of the metering circuit SPC is supplied to the analog input port with the A/D converting function of said control circuit PRS and is A/D-converted for use as metering data for controlling the shutter control circuit SHT and the aperture control circuit APR. LCOM designates a lens communication circuit which receives data input through the data bus DBUS while a control signal CLCOM is input, and effects serial communication with a lens unit to be described, on the basis of said data. The lens communication circuit LCOM transmits data DCL for lens driving indicative of the amount of movement of a photo-taking lens FLNS in the direction of the optic axis to a control circuit in the lens to be described in synchronism with a clock signal LCK and at the same time, lens information DCL such as the coefficient of the amount of non-in-focus of the photo-taking lens FLSS versus the amount of movement of the lens is serial-input from the control circuit in the lens to the lens communication circuit. BSY denotes a signal for informing the camera side as to whether the photo-taking lens FLNS is being moved. When this signal is "H" (high level), said serial communication becomes impossible.

LNSU designates a lens unit, LPRS denotes a control circuit in the lens for driving a motor MTR on the basis of the serial-input data DLC and moving the photo-taking lens FLNS in the direction of the optic axis, and ENC designates an encoder circuit which, for example, detects a pulse signal generated with the movement of a lens barrel holding the photo-taking lens FLNS and outputs an encoder pulse signal EPL as the current position information of the photo-taking lens FLNS to the control circuit LPRS in th lens.

SDR denotes a sensor driving circuit for controlling a line sensor such as CCD having two sensor rows SAA and SAB in accordance with signals STR and ck input from the control circuit PRS. In FIG. 1, the line sensor SNS is divided into the two sensor rows SAA and SAB, but alternatively, a single sensor row may be electrically divided into two.

The operation of the FIG. 1 embodiment will now be described with reference to FIGS. 2 to 14. The operations of the shutter control circuit SHT, the aperture control circuit APR, the display circuit DSP and the metering circuit SPC have no direct relation with the present invention and therefore need not be described in detail herein. Also, the present embodiment assumes a form in which the "AF" flow is called as a subroutine from the sequence flow of the camera.

Figure 2:
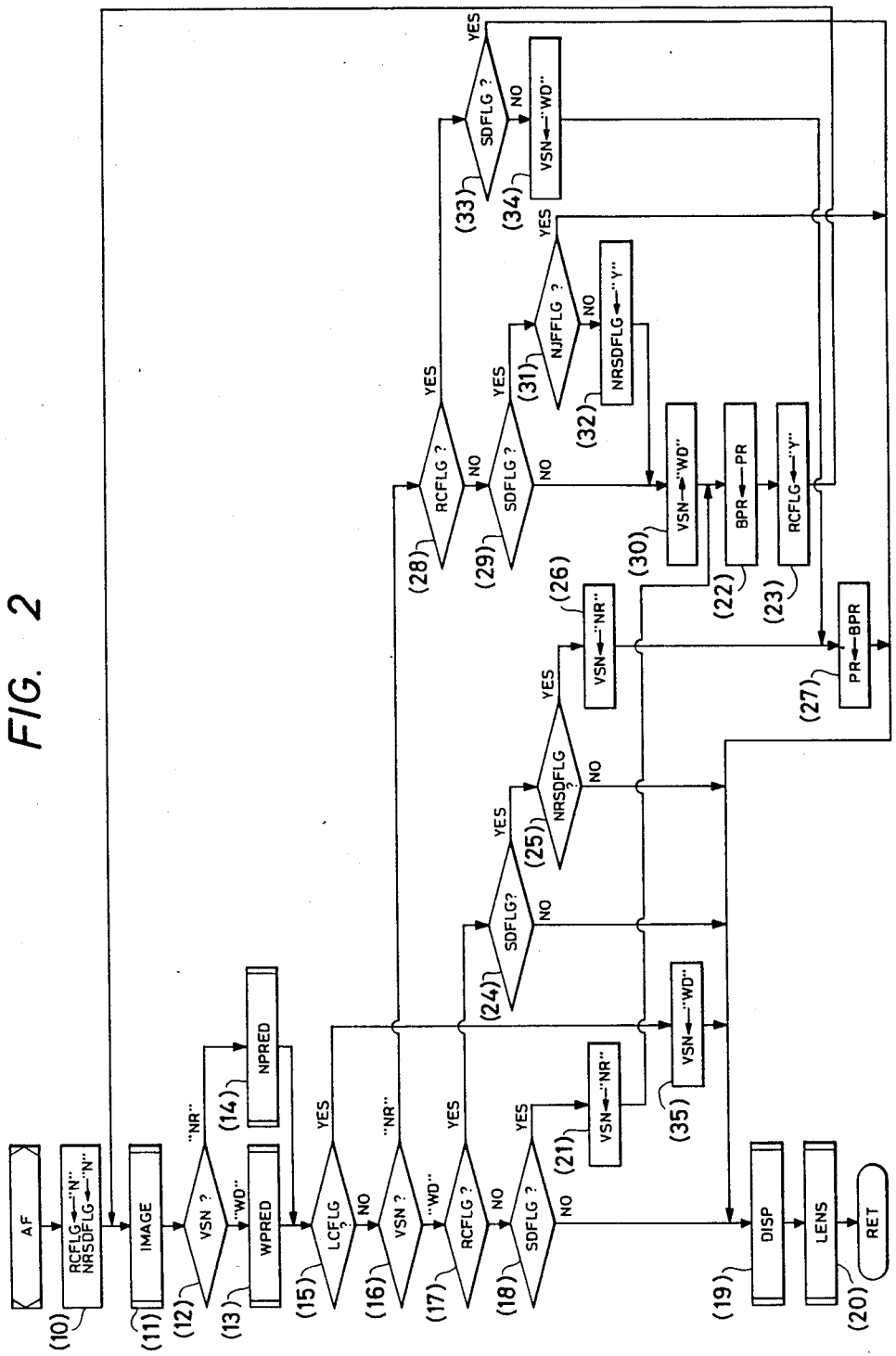
FIG. 2 is a flow chart of a portion of the apparatus of FIG. 1.
Figure 3:
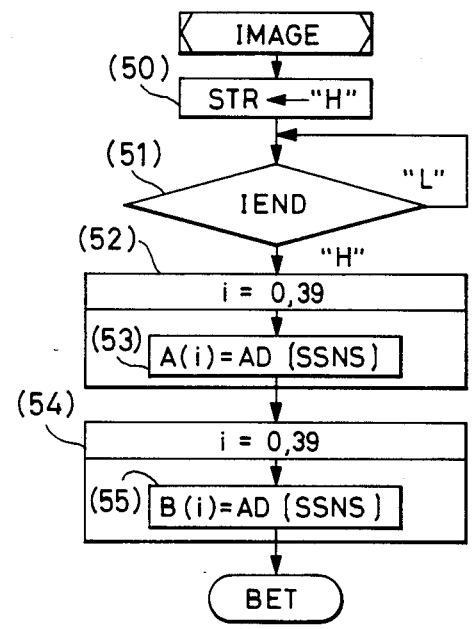
FIG. 3 is also a flow chart of a portion of the apparatus of FIG. 1.

When AF operation is started, two flags RCFLG and NRSDFLG are first rendered into "N" (which means NO) (step 10 of FIG. 2). The functions of the flags RCFLG and NRSDFLG will be described later. Subsequently, image signal reading subroutine "IMAGE" is called (step 11). Here, the line sensor SNS is driven through the sensor driving circuit SDR, and image signals A(i) and (Bi) of two images are obtained. The then operations of the sensor driving circuit SDR, the line sensor SNS, etc. will be briefly described with reference to FIGS. 1 and 3. When an accumulation start signal STR of "H" is output from the control circuit PRS (step 50 of FIG. 3), a clear signal CL is output from the sensor driving circuit SDR to the line sensor SNS, and the charges of the photoelectric converting portions of the sensor rows SAA and SAB are cleared. Thereupon, in the line sensor SNS, photoelectric conversion and charge accumulating operations of optical images formed on the sensor rows SAA and SAB by a secondary imaging lens or the like disposed at the preceding stage (which is disposed in the state as shown in FIG. 15 although not shown in FIG. 1) are started. When a predetermined time elapses after said operations have been started, a transfer signal SH is output from the sensor driving circuit SDR to the line sensor SNS, and charges accumulated in the photoelectric converting portion are transferred to the CCD unit. At the same time, an accumulation end signal IEND of "H" is produced in the sensor driving circuit SDR, and this signal is input to the control circuit PRS (step 51). Thereafter, when a CCD driving clock CK is output from the control circuit PRS, CCD driving signals $\phi_1$ and $\phi_2$ are output from the sensor driving circuit SDR. Thereby, an analog image signal SSNS is output from the line sensor SNS to the control circuit PRS in accordance with these signals, and in response thereto, the control circuit PRS A/D-converts the analog image signal SSNS in synchronism with the CCD driving clock CK, and stores it as the image signals A(i) and B(i) of two images in a predetermined address in the RAM (steps 52–55). It is assumed that the number of picture elements of the sensor rows SAA and SAB is 40.

Figure 4:
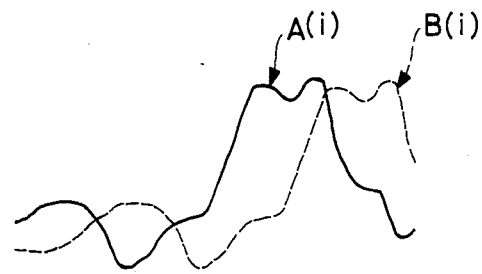
FIGS. 4 and 5 show an example of image signals output from sensor rows.
Figure 5:
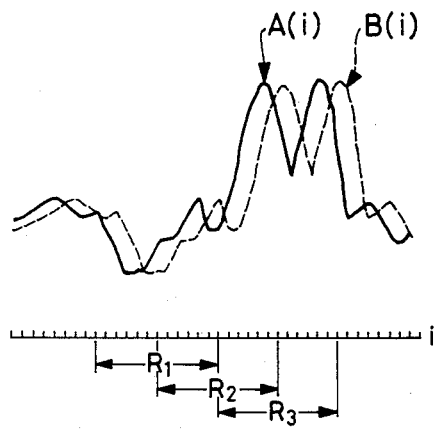

Turning back to FIG. 2, step 12 is a flag VSN in which whether focus detecting operation should be effected with all or some of the picture elements as the object range to be processed depending on the non-in-focus state is determined. That is, the range of the picture elements to be processed for which focus detecting operation is effected is set, and at this step, in the case of "WD" (which means a great amount of non-in-focus), a focus detecting subroutine "WPRED" is called, and in the case of "NR" (which means near the in-focus state), a focus detecting subroutine "NRPRED" is called (step 12). For example, when the image signal greatly deviates from the in-focus state as shown in FIG. 4, the subroutine "WPRED" is adopted, and when the image signal is near the in-focus state as shown in FIG. 5, the subroutine "NRPRED" is adopted. During the closing of the main switch, the flag VSN is set to "WD" (because this is the first point of time at which the non-in-focus state cannot be known), and when AF operation is started, the flag VSN is reset to "WD" or "NR" depending on the focus state at that point of time. This resetting will be described later.

The focus detection processing when the subroutine "WPRED" is called will now be described in accordance with the flow of FIG. 6. At steps 100–105, the focus evaluated amount when the amount of relative displacement k has been changed within the range of "−20–20" is found, for example, as X(k). It is because the number of picture elements of the sensor rows SAA and SAB is assumed as "40" as previously described that the amount of relative displacement k is limited to the range of −20 to 20, but this range of picture elements to be processed may be made variable in conformity with the focal length of the photo-taking lens FLNS used.

First, at step 101, the number of operation picture elements M is calculated by the equation that $M=39-|k|$. The number of operation picture elements M is variable in conformity with the amount of relative displacement k and becomes smaller as the absolute value of k becomes greater. This is because the output of the corresponding sensor lacks from the end portion as the amount of relative displacement k becomes greater. At step 102, the sign (positive or negative) of the amount of relative displacement k is examined, and then at step 103 or 104, the positions PA and PB of the leading picture elements for which the operations of images A and B are effected are calculated in conformity with the sign. At step 105, the focus evaluated value X(k) is calculated.

Figure 7A:
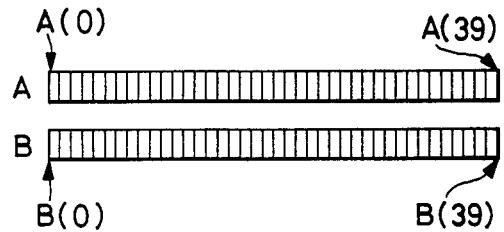
FIGS. 7(a)-7(d) show the relation of correspondence between two images during the focus detection operation.
Figure 7B:
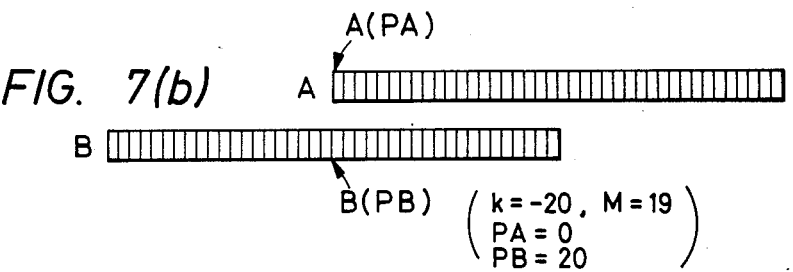
Figure 7C:
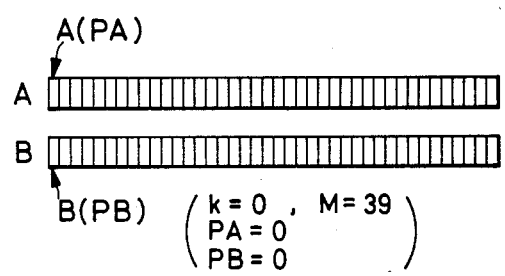
Figure 7D:
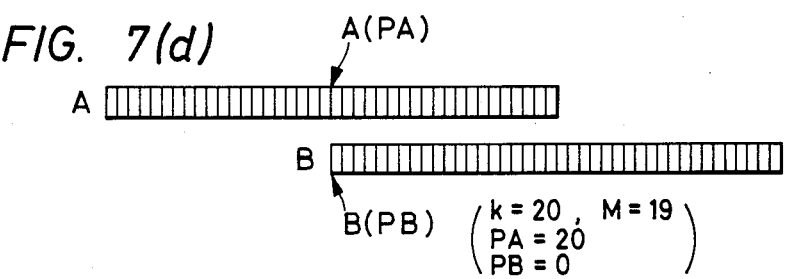

The treatment process at the steps 100–105 will now be described with reference to FIG. 7. FIG. 7(a) depicts two image signals A(i) and B(i). FIG. 7(b) depicts the relation of correspondence between the sensor rows for correlated operation when k=−20, and at this time, $M=39-|20|=19$, and PA is "0" and PB is "20". That is, the amount of relative displacement k is of a negative value and therefore, the image B is relatively displaced to the left by k picture elements (−20 picture elements). What has been calculated by a relation of correspondence in which the image B has been further displaced by a picture element from said relation of correspondence to the left corresponds to the first term of the equation for finding X(−20). What has been calculated by a relation of correspondence in which the image A has been displaced by a picture element to the left corresponds to the second term of said equation. By the first and second terms, calculations are effected with the images A and B displaced by a picture element each to the left and therefore, when calculating said number of operation picture elements M, use is made of $M=39-|k|$ instead of $M=40-|k|$. FIG. 7(c) depicts the relation of correspondence when k=0. FIG. 7(d) depicts the relation of correspondence between the correlated operations when k=20, and in this figure, conversely to FIG. 7(b), the image A is displaced by 20 picture elements to the left.

Figure 8:
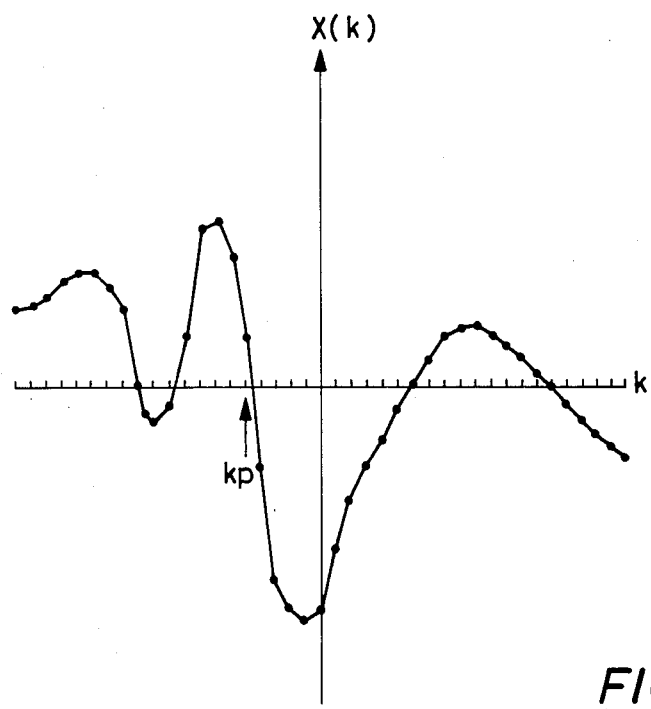
FIG. 8 shows a variation in the evaluated amount.

FIG. 8 shows an example of the focus evaluated amount X(k) calculated in the manner described previously as it is plotted.

Figure 6:
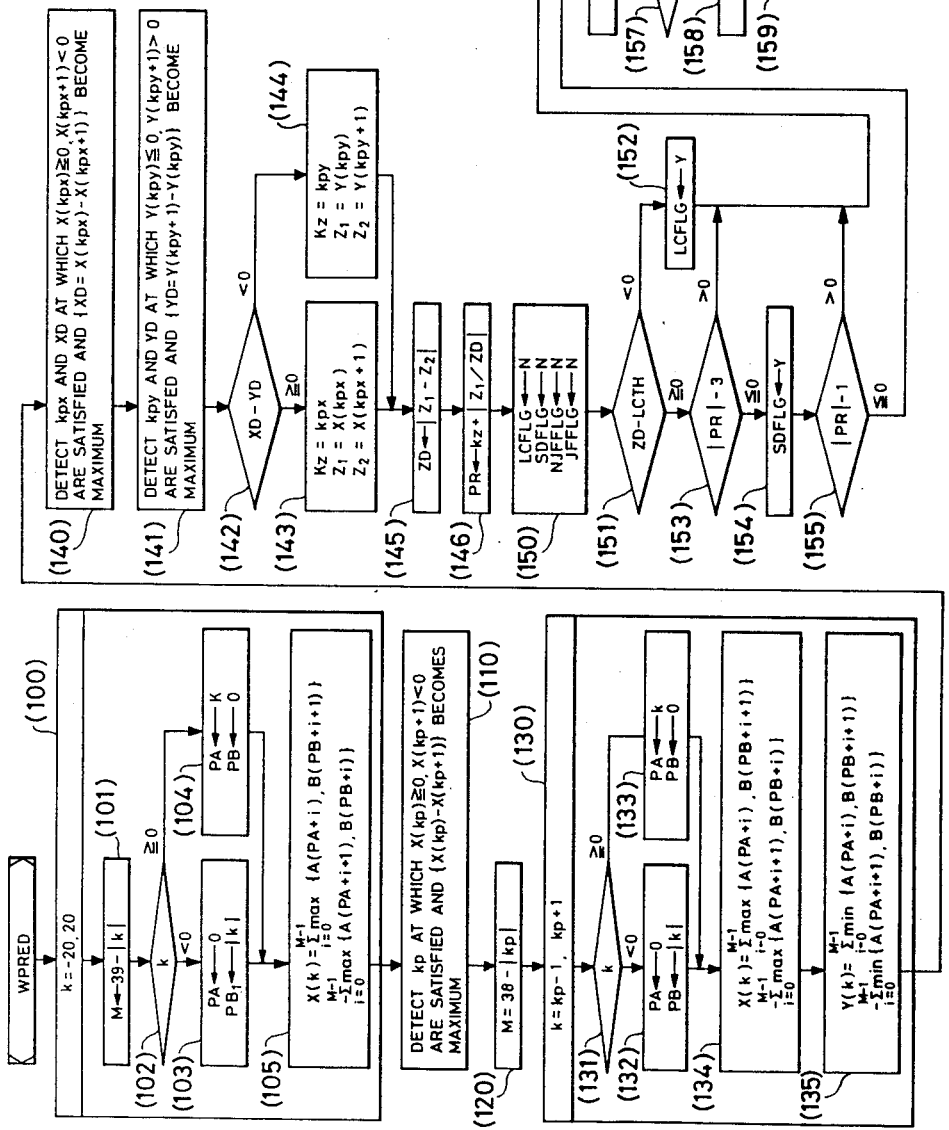
FIG. 6 is a flow chart of a portion of the apparatus of FIG. 1.

Turning back to the flow of FIG. 6, at step 110, the peak value Kp of the amount of image deviation between the picture element units of the two images A and B is detected from the focus evaluated amount X(k). Thereafter, at steps 120–146, the amount of image deviation PR below the picture element unit is found, and at steps 120–135, two focus evaluated amounts X(k) and Y(k) are re-calculated on the basis of the peak value Kp found at the step 110. There are two reasons for this. One of them is that at the aforementioned step for finding Kp, the number of operation picture elements M is variable in conformity with the amount of relative displacement k and if the amount of image deviation PR below the picture element unit is found by interpolating the focus evaluated amount X(k) calculated within such a variable operation range, there is an undesirable possibility that said amount of image deviation PR includes an error attributable to the incoincidence of the number of operation picture elements M. The other reason is that the use of a combination of X(k) and Y(k) is more excellent in terms of S/N as described in Japanese Laid-Open Patent Application No. 101513/1985 than finding the amount of image deviation PR solely by the focus evaluated amount X(k). From what has been described above, at steps 120–135, the number of operation picture elements M is made constant on the basis of Kp (step 120), and the focus evaluated amounts X(k) and Y(k) are found at a time.

First, at step 120, the calculation that $M=38-|Kp|$ is effected to determine the value of the number of operation picture elements M. Then at steps 130–135, the focus evaluated amounts X(k) and Y(k) are calculated in the same manner as previously described at three points $K=Kp-1$, Kp and Kp+1 with the previously found Kp as the center. It is for the purpose of fixing the number of operation picture elements M at the number of operation picture elements M for the amount of relative displacement whose absolute value is greatest among the three points $K=Kp-1$, Kp and Kp+1 that when finding the number of operation picture elements M, M has been $M=38-|Kp|$. Subsequently, the amounts of image deviation Kpx and Kpy of the picture element unit by the respective focus evaluated amounts are again detected from the focus evaluated amounts X(k) and Y(k) found in the manner described previously (steps 140 and 141).

Figure 9:
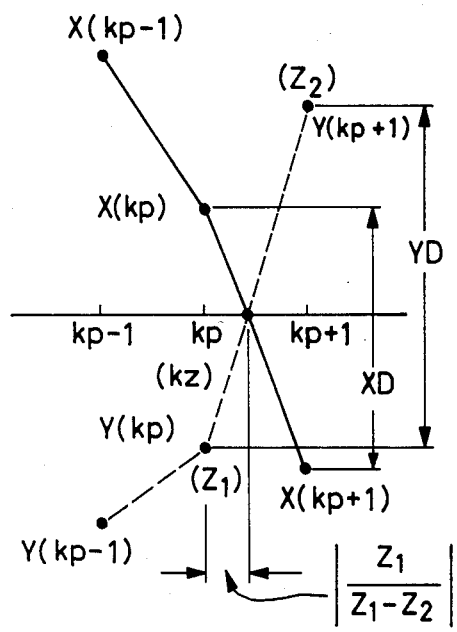
FIG. 9 also shows a variation in the evaluated amount.

At this time, $XD(XD=X(kpx)-X(kpx+1))$ and $YD(YD=Y(kpx+1)-Y(kpx))$ generally representing the contrast evaluated amounts of the focus evaluated amounts X(k) and Y(k) are also found. This is because in this embodiment, comparing the magnitude of the image signal in the end portion during each relative displacement in accordance with the operation method as disclosed in the aforementioned prior application is not effected (since the operation processing becomes complex). In this embodiment, with attention being paid to the fact that the information as if the image signal in the end portion during each relative displacement was watched is obtained by watching the contrast evaluated amounts XD and YD for which the information of the image signal in the end portion is also taken into account when the amount of non-in-focus is great, said information is used, and this means that the greater the contrast evaluated amounts XD and YD, the more excellent in terms of S/N. Therefore, at step 142, the two contrast evaluated amounts XD and YD are compared and when XD≧YD, the focus evaluated amount X(k) is adopted (step 143), and when XD<YD, the focus evaluated amount Y(k) is adopted (step 144). At steps 145 and 146, by the use of adopted $ZD(Z_1-Z_2)$ and kz, the interpolating operation of $$PR=kz+|Z_1/ZD|$$

is effected to find the amount of image deviation PR below the picture element unit. This process is shown in FIG. 9. In the example as shown in this figure, XD and YD are in the relation that XD<YD and therefore, the focus evaluated amount Y(k) is adopted, and when the amount of image deviation PR below the picture element unit is to be calculated, $Kz=Kpy$, $Z_1=Y(kp)$ and $Z_2=Y(kp+1)$ are used.

Steps 150–158 are a process for determining the focus state. First, at step 150, four flags LCFLG, SDFLG, NJFFLG and JFFLG are set to "N". Qualitatively describing the meanings of the respective flags, "LCFLG" is a flag representing that the object image signal is of low contrast, "SDFLG" is a flag representing that the amount of deviation between two images is relatively small, that is, the amount of non-in-focus of the photo-taking lens FLNS is relatively small, "NJFFLG" is a flag representing that the amount of deviation between two images is considerably small, that is, the photo-taking lens FLNS is substantially in focus, and "JFFLG" is a flag representing that the amount of deviation between two images is almost zero, that is, the photo-taking lens is in focus.

Subsequently, the contrast evaluated amount ZD of the adopted focus evaluated amount is compared with a predetermined value LCTH (step 151). When ZD<LCTH as a result, the contrast is regarded as being low and "LCFLG" is set to "Y" (which means YES), and the subroutine "WPRED" is terminated. When ZD≧LCTH, the contrast is regarded as being sufficient to effect focus detection, and an advance is made to the next step 153. At step 153, the absolute value PR of the amount of image deviation PR is compared with a predetermined value "3", and when PR>3, that is, when the amount of image deviation is three picture elements or more, the subroutine "WPRED" is terminated. When PR≦3, the amount of non-in-focus is relatively small and therefore, "SDFLG" is set to "Y" (step 154), and then PR is compared with a predetermined value "1" (step 155). When PR>1 as a result, that is, when the amount of image deviation is one picture element or more, the subroutine "WPRED" is terminated here. When PR>1, the photo-taking lens is regarded as being substantially in focus and "NJFFLG" is set to "Y" (step 156), and finally PR is compared with a predetermined value JFTH (step 157). The predetermined value JFTH is a value for which the amount of image deviation PR can be regarded as in-focus. When PR>JFTH as a result, the subroutine "WPRED" is terminated here. When PR≦JFTH, the photo-taking lens is regarded as being in focus and "JFFLG" is set to "Y" (step 158), and the subroutine "WPRED" is terminated. The functions of the four flags LCFLG, SDFLG, NJFFLG and JFFLG will be described later.

Figure 10:
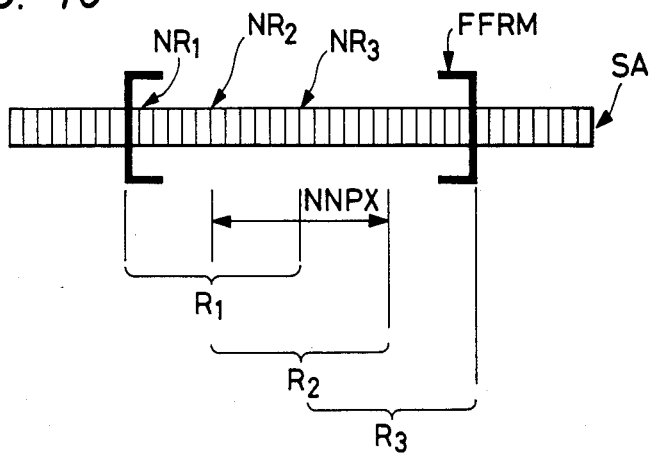
FIG. 10 shows the positional relation between the range finding frame of the viewfinder and the sensor row.

The subroutine "NPRED" will now be described. "NPRED" is a focus detecting process which is applied when the photo-taking lens is near the in-focus state, and of all sensors, the focus detecting process is effected only by the data within a range corresponding to the range finding frame in the viewfinder. This will be described with reference to FIG. 10 showing the positional relation between the viewfinder and the sensor row SA. In FIG. 10, FFRM is the range finding frame on the viewfinder. In the subroutine "NPRED", the range of the range finding frame FFRM is divided into three areas so as to be shown by $R_1$, $R_2$ and $R_3$, and at what picture elements of the sensor row SA the areas $R_1$, $R_2$ and $R_3$ in the range finding frame FFRM are positioned is pre-examined in the process of adjusting picture element positions $NR_1$, $NR_2$ and $NR_3$ corresponding to the tops of the respective portions, and is memorized by the EEPROM in the control circuit PRS. NNPX then included in each portion is the same ($R_1=R_2=R_3$), and this value NNPX is likewise memorized by the EEPROM. In this embodiment, NNPX=12 and $NR_1$, $NR_2$ and $NR_3$ are "8", "14" and "20", respectively, and (NNPX+K) is the range to be processed in this case (the portion indicated by hatching in FIG. 12). These values may sometimes shift by several picture elements in conformity with the situation in which the focus detecting optical system and the line sensor SNS are mounted, but since they are memorized by the EEPROM as previously described, the range finding frame FFRM and the range of the operation in which the focus detecting process is effected can be made coincident with each other. $R_1$, $R_2$ and $R_3$ shown for the image signals of FIG. 5 are the divided areas in the above-described subroutine "NPRED" process.

Figure 11:
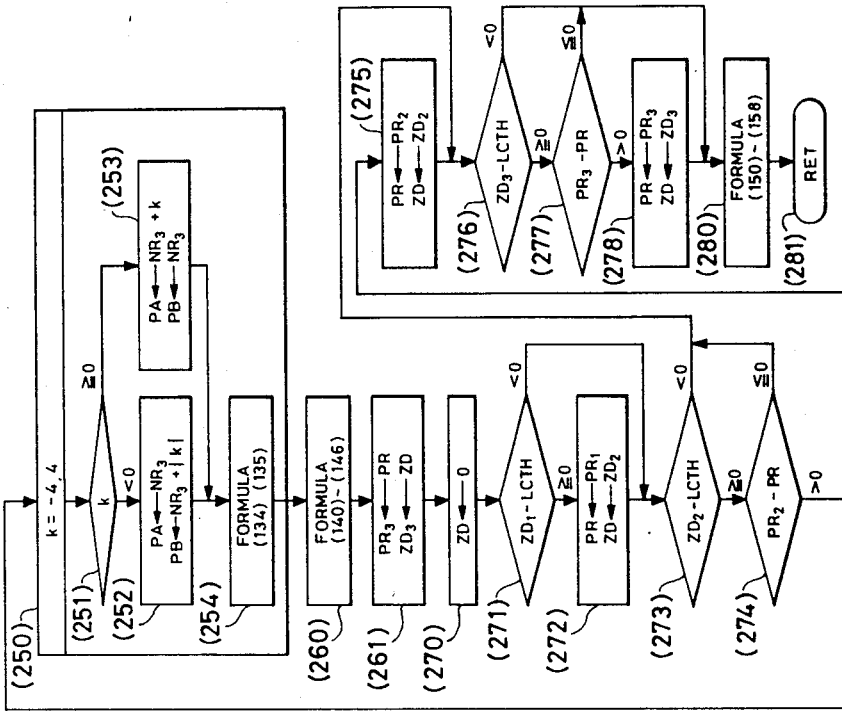
FIG. 11 is a flow chart of a portion of the apparatus of FIG. 1.
Figure 11:
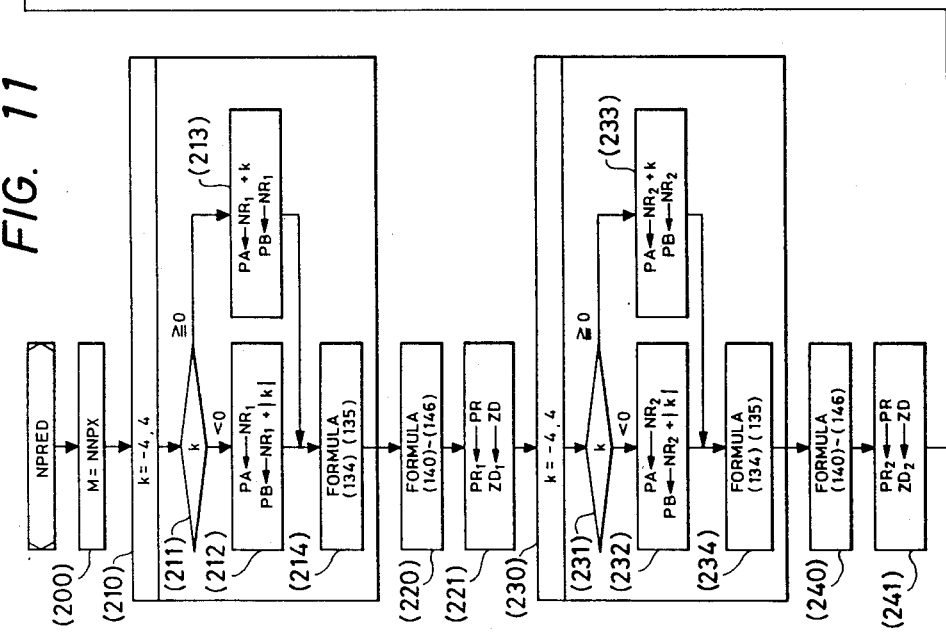
Figure 12A:
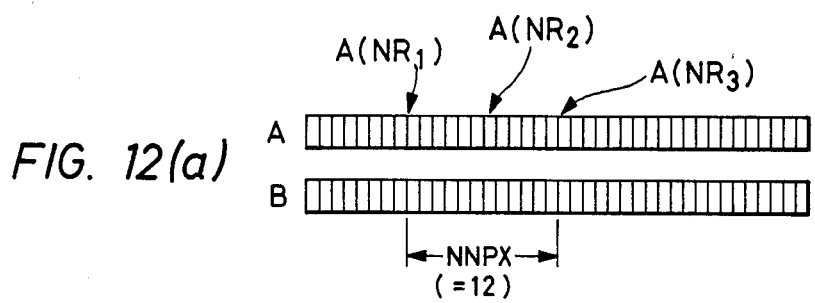
FIGS. 12(a)-12(d) show the relation of correspondence between two images during the focus detection operation.
Figure 12B:
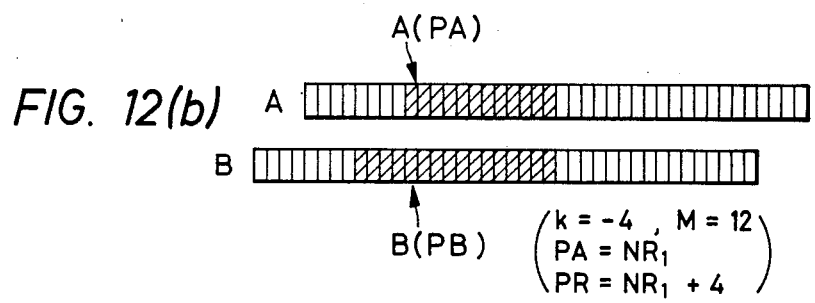
Figure 12C:
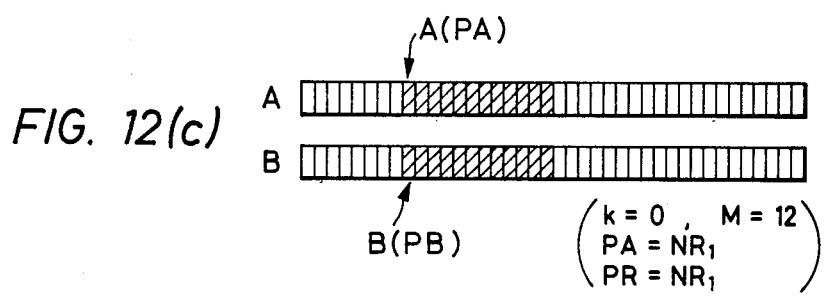
Figure 12D:
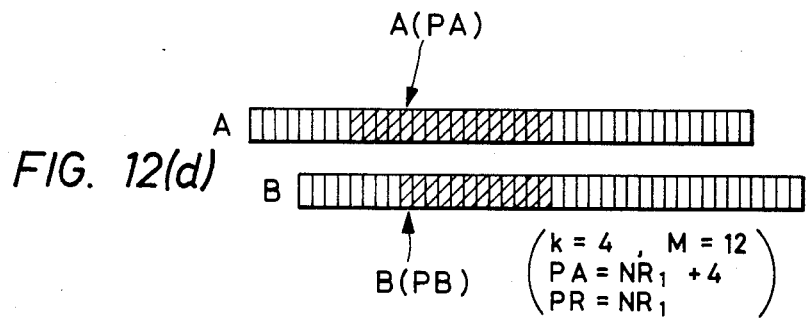

The operation when the subroutine "NPRED" is called will now be described in accordance with the flow of FIG. 11. At step 200, the number of operation picture elements M is fixed at NNPX. In the aforedescribed subroutine "WPRED", the number of operation picture elements M has been variable in conformity with the amount of relative displacement K, whereas in this focus detecting process, it is fixed at NNPX. This is because "WPRED" uses the outputs of all picture elements for the operation, whereas in "NIPRED", the output of a part of the sensor row SA and therefore the data of the end of the corresponding sensor output does not lack by displacement. Therefore, in "NPRED", there is not effected the re-operation which was effected at the steps 120-141 of "WPRED" with the number of operation picture elements M being constant. Also, since the re-operation is not effected, the evaluated amounts X(k) and Y(k) are found at a time from first.

Steps 210-221 are a focus detecting process for the image data of the area $R_1$. In FIG. 11, the same process portion as "WPRED" is given the same step number. In the subroutine "NPRED", the range of the amount of relative displacement K is −4−4. This is because "NPRED" is applied near the in-focus state and therefore the amount of image deviation is originally small. In this case, as shown in steps 212 and 213, the leading position $NR_1$ of the area $R_1$ is taken into account. This treatment process is shown in FIG. 13(a). In this figure, the solid line represents the focus evaluated amount X(k) and the broken line represents the focus evaluated amount Y(k). By the same processing (steps 140-146) as that described with respect to "WPRED", the amount of image deviation $PR_1$ in the area $R_1$ is found. At step 221, the amount of image deviation $PR_1$ and the contrast evaluated amount $ZD_1$ are stored in the RAM in the control circuit PRS. Likewise, at steps 230-241, the amount of image deviation $PR_2$ and the contrast evaluated amount $ZD_2$ (see FIG. 13(b)) in the area $R_2$ are found, and at steps 250-261, the amount of image deviation $PR_3$ and the contrast evaluated amount $ZD_3$ (see FIG. 13(c)) in the area $R_3$ are found, and these are also stored in the RAM in the control circuit PRS.

At steps 270-278, which of the amounts of image deviation $PR_1$, $PR_2$ and $PR_3$ in the three areas $R_1$, $R_2$ and $R_3$ found in the manner described above is the final amount of image deviation PR is judged. That is, in the present embodiment, of the three areas, the amount of image deviation which is sufficiently high in contrast and greatest is adopted. The meaning of the adoption of the greatest amount of image deviation is that when the amount of image deviation is positive, the photo-taking lens is in near focus and the rearest focus object is the object on the closest side and the focus is adjusted to that object. After the final amount of image deviation PR and the contrast evaluated amount ZD have been found, the focus state is determined at step 280. The processing here is similar to the processing described with respect to "WPRED" and therefore need not be described.

As described above, when the amount of non-in-focus is great, the then amount of image deviation, i.e., the then amount of non-in-focus of the photo-taking lens FLNS, can be detected by the subroutine "WPRED", and in the near-the-in-focus state, the then amount of image deviation, i.e., the then amount of non-in-focus of the photo-taking lens FLNS, can be detected by the subroutine "NPRED".

Turning back to FIG. 2, the description of step 15 and so forth will be continued. Step 15 checks the contrast during the focus detecting process of "WPRED" or "NPRED" previously carried out with the flag LCFLG watched. When LCFLG is "Y", the contrast is regarded as being low and the flag VSN is set to "WD" (step 35) so that the next focus detecting process uses "WPRED", and a display subroutine "DISP" and a lens control subroutine "LENS" are executed (steps 19 and 20). The display subroutine "DISP" has no direct relation with the present invention and need not be described herein, while the lens control subroutine "LENS" will be described later At step 16, the flag VSN is again checked. When the flag VSN is "WD", the processing of step 17 and so forth is effected, and when the flag VSN is "NR", the processing of step 28 and so forth is effected The processing when VSN="WD" will first be described. VSN="WD" represents that the previous focus detecting process has been carried out by "WPRED" At step 17, a flag RCFLG is checked. The flag RCFLG becomes "Y" when the focus detecting process is carried out twice within the routine "AF". In the present embodiment, when the routine "AF" is to be executed, "WPRED" or "NPRED" is executed at first by the flag VSN set by the previous routine "AF" (VSN becomes "WD" at the initial stage whereat release has been effected), but when the amount of image deviation which is the result thereof is not appropriate for respective conditions, VSN is reset and the flag RCFLG is set to "Y" so that a different focus detecting process "NPRED" or "WPRED" is now executed. RCFLG is the flag for that purpose. The resetting of VSN will be described later.

When the flag RCFLG is "N", that is, during the first focus detecting process, the flag SDFLG is checked (step 18). SDFLG is a flag set in "WPRED" or "NPRED" as previously described (the flag SDFLG at this step is set in "WPRED"), and when this flag is "Y" (within three picture elements), it means that the current focus state is relatively approximate to the in-focus state. Accordingly, if VSN is "WD" and SDFLG is "N" (three picture elements or more), "WPRED" is regarded as being appropriate and a shift is made to the execution of the display subroutine "DISP" and the lens control subroutine "LENS". On the other hand, if SDFLG is "Y", it is considered that it is more appropriate to effect re-operation by "NPRED", that is, an amount of image deviation PR better in accuracy can be obtained, and VSN is set to "NR" (step 21), the amount of image deviation PR is temporarily stored in a buffer BPR (step 22), RCFLG is set to "Y" (step 23), and a shift is again made to the routines of step 12 and so forth (actually, step 12→step 14→step 15→step 16→step 28→step 33→). The reason why at the aforementioned step 22, the amount of image deviation PR is temporarily stored in the buffer BPR is that when the result of the operation effected in the next subroutine "NPRED" is not appropriate, that is, when SDFLG at step 33 is "N" (three picture elements or more) as a result of the operation effected in "NPRED", the amount of image deviation PR obtained in the first subroutine "WPRED" is adopted (step 34→step 27→).

When at step 17, RCFLG is "Y", that is, during the second focus detecting process, a shift is made to step 24 where SDFLG is checked. If the result is that SDFLG is "N", the then focus detecting process is carried out in "WPRED" and thus, that focus detecting process is regarded as being appropriate and a shift is made to the execution of the display subroutine "DISP" and the lens control subroutine "LENS" When SDFLG is "Y", RCFLG is "Y" and VSN is "WD" and therefore, the first focus detecting process is carried out in "NPRED" and the result is not appropriate in "NPRED" As will be described later, in the first "NPRED", inappropriateness is judged unless the flag NJFFLG is "Y", that is, unless the photo-taking lens is substantially in focus, but if SDFLG is "Y", the flag NRSDFLG is set to "Y" (although not in focus, yet within one picture element). That is, if NRSDFLG is "Y", it means that in the first "NPRED", the photo-taking lens has been not substantially in focus, but relatively approximate to the in-focus state. At this time, the amount of image deviation PR in "NPRED" is temporarily stored in the buffer BPR. Accordingly, if at step 24, SDFLG is "Y", the photo-taking lens is relatively approximate to the in-focus state in the second "WPRED" and therefore, at step 25, the flag NRSDFLG is checked up to refer to the result of the first "NPRED". If NRSDFLG is "N" (one picture element or more), it means that the first "NPRED" is not appropriate, and by the use of the amount of image deviation PR in the second "WPRED", a shift is made to the execution of the display subroutine "DISP" and the lens control subroutine "LENS". If NRSDFLG is "Y", in the next "AF", VSN is set to "NR" to render the first focus detecting process into "NPRED" (step 26), and the amount of image deviation PR in the first "NPRED" already stored in the buffer BPR is taken out (step 27), and a shift is made to the execution of the display subroutine "DISP" and the lens control subroutine "LENS".

Going back in the flow, when VSN is judged as "NR" at step 16, the flag RCFLG is checked up at step 28. When RCFLG is "N", it means the first "NPRED", and when RCFLG is "Y", it means the second "NPRED". When RCFLG is "N", the flag SDFLG is checked at step 29. When SDFLG is "N", "NPRED" is regarded as being inappropriate and VSN is set to "WD" to cause the second focus detecting process to be carried out in "WPRED" (step 30), the amount of image deviation PR in "WPRED" is temporarily stored in the buffer BPR (step 22), RCFLG is set to "Y" (step 23), and a shift is again made to the execution of the routine of step 12 and so forth (actually, step 12→step 13→step 15→step 17→step 24→). When at step 29, SDFLG is "Y", the flag NJFFLG is checked at step 31. As already described with respect to step 25, whether the focus detecting process has been appropriate is determined in the first "NPRED" by NJFFLG If at step 31, NJFFLG is "N" (more than one picture element and less than three picture elements), it means that the photo-taking lens is not substantially in focus, but relatively approximate to the in-focus state, and for use at step 25 which is the second focus detecting process "WPRED" again carried out in preparation for the worst case, the flag NRSDFLG is set to "Y" and a shift is made to step 30. Also, the amount of image deviation PR in the first "NPRED" temporarily stored in the buffer BPR at step 22 is used as required, i.e., at step 27 which is the second "WPRED".

When at the aforementioned step 28, RCFLG is "Y", it is the second "NPRED", and as seen from the foregoing description, it means that in the first "WPRED", the result has been determined as being inappropriate. Also, as previously described, if at step 33, SDFLG is checked and it is "Y", the second "NPRED" is determined as being appropriate, and with the amount of image deviation PR left as it is, a shift is made to the execution of the display subroutine "DISP" and the lens control subroutine "LENS". If SDFLG is "N", the second "NPRED" is regarded as being inappropriate, and VSN is set to "WD" to set the focus detecting process in the next "AF" to "WPRED" (step 34), the amount of image deviation PR temporarily stored in the buffer BPR is taken out in the first "WPRED" (step 27), and a shift is made to the execution of the display subroutine "DISP" and the lens control subroutine "LENS".

Briefly summing up the above-described flow of "AF" processing, when "AF" is called, the image signal of the sensor row SA is read in ("IMAGE") and the focus detecting process "WPRED" or "NPRED" is carried out, and under the premise that "WPRED" is applied when the amount of non-in-focus is great and "NPRED" is applied in the case of near-in-focus, if the detected amount of image deviation is inappropriate for the then processing, the same image signal is re-opera,ted by an appropriate processing system and after all, the amount of image deviation PR adopted for the lens control is calculated by "WPRED" when the amount of non-in-focus is great, and is calculated by "NPRED" in the case of near-in-focus. This is because when the amount of non-in-focus is great, the non-in-focus state can be better known if the focus detecting process is carried out by "WPRED", and because when this result is judged as being near-in-focus, the focus detection accuracy can be more enhanced if the focus detecting process is carried out by "NPRED".

Figure 14:
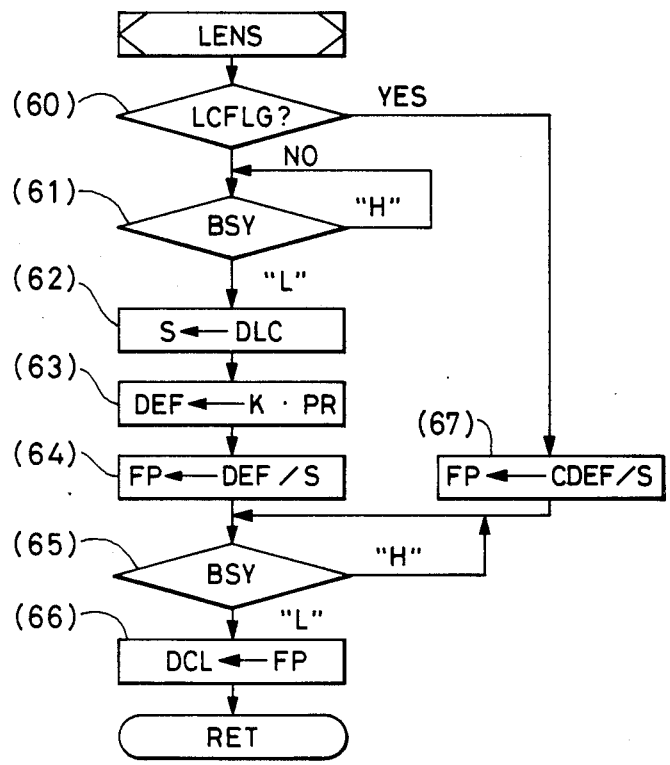
FIG. 14 is a flow chart of a portion of the apparatus of FIG. 1.

The subroutine "LENS" will now be described with reference to the flow of FIG. 14. At step 60, the flag LCFLG is checked. As previously described, this flag is "N" when the contrast evaluated amount of the image signal which is the object of the focus detecting process is high. When the flag LCFGG is "N", the image signal is regarded as having a sufficient contrast for the focus detecting process and the control of the photo-taking lens FLNS is effected on the basis of the amount of image deviation PR which is the result of the processing. First, a signal BSY input to the lens communication circuit LCOM is checked (step 61). During the time this signal BSY is "H", the lens communication circuit is unable to communicate with the control circuit LPRS in the lens and therefore waits until the signal BSY becomes "L" (low level) When the signal BSY becomes "L", the coefficient S of the amount of defocus of the photo-taking lens FLNS versus the amount of movement of the lens is input from a signal DLC from the control circuit LPRS in the lens (step 62). Subsequently, the amount of defocus DEF of the photo-taking lens FLNS is calculated from the amount of image deviation PR by an equation $DEF = K \cdot PR$ (step 63). K is a value preset by the focus detecting optical system. Subsequently, the amount of movement FP of th photo-taking lens FLNS is calculated from the amount of defocus DEF and the coefficient S by $FP = DEF/S$ (step 64). FP corresponds to the count number of the encoder circuit ENC. At step 65, the signal BSY is again checked and, when the signal BSY becomes "L", the amount of lens movement FP (signal DCL) is communicated to the control circuit LPRS in the lens (step 66). On the other hand, when LCFLG is "Y", the contrast is regarded as being insufficient and the amount of movement FP of the photo-taking lens FLNS is calculated by $FP = CDEF/S$ to effect a searching operation (step 67). CDEF is a result obtained by converting the amount of movement of the lens moved by one searching operation into the amount of defocus, and is preset.

When said amount of lens movement FP is input, the control circuit LPRS in the lens controls the driving of the photo-taking lens FLNS. By the photo-taking lens FLNS being stopped, the series of "AF" processings of the focus adjustment started from the inputting of the image signals A(i) and B(i) are terminated.

According to the present embodiment, the contrast evaluated amounts XD and YD are compared over all the range of relative displacement and one of them which is greater, i.e., the focus evaluated amount X(k) or Y(k) which is more excellent in terms of S/N, is used for the calculation of the amount of image deviation PR and therefore, the focus state of higher accuracy can be detected.

As described above, according to the present embodiment, calculating means for finding, from first and second evaluated amounts, third and fourth evaluated amounts depending on the contrast of first and second signals and selecting means for selecting said first evaluated amount or said second evaluated amount used when the amount of deviation between first and second images, in conformity with the relation in magnitude between said third and fourth evaluated amounts, are provided in operation means, whereby said first evaluated amount and said second evaluated amount are suitably changed over for use over all the range of relative displacement and therefore, even when the deviation of the relative position of the two images is great, focus detection of good accuracy can be accomplished.

We claim:

1. An apparatus for detecting the focus adjusted state of an objective optical system, comprising:
    optical means for forming first and second light distributions of an object, said first and second light distributions having their relative positional relation varying in accordance with the focus adjusted state of the objective optical system;
    light-receiving means for receiving said first and second light distributions and providing output signals, said light-receiving means having first and second ranges each provided with a plurality of picture elements; and
    operation means for calculating a valve indicative of the focus adjusted state of said objective optical system in accordance with a plurality of different calculations using the output signals of said light-receiving means, said operation means (1) calculating a first value indicative of the focus adjusted state of said objective optical system by using one of said different calculations, (2) calculating second values indicative of the focus adjusted state of said objective optical system in said plurality of different calculations respectively by using said first value, (3) calculating evaluation values depending upon a contrast of the object determined in each of said different calculations, and (4) selecting one of said second values on the basis of said evaluation values.

2. An apparatus according to claim 1, wherein said operation means includes means for (a) selecting, using one of said plurality of different calculations, one of the light-receiving means output signals regarding the first light distribution and a light-receiving means output signal regarding the second light distribution which is greater in magnitude, and (b) selecting one of the two selected signals which is smaller in magnitude.

3. An apparatus according to claim 1, wherein said operation means includes means for relatively varying the picture elements of said first and second ranges in each of said plurality of different calculations.

4. An apparatus according to claim 1, wherein said operation means includes means for calculating said first value by keeping constant a number of picture elements which are used in a calculation in which picture elements in said first range and picture elements in said second range are relatively moved.

5. An apparatus according to claim 1, wherein said operation means includes means for calculating said evaluation values by inclining a function in a vicinity of said second value.

6. A method of detecting the focus adjusted state of an objective optical system, comprising the steps of:
   forming first and second light distributions of an object, said first and second light distrubutions having their relative positional relation varying in accordance with the focus adjusted state of the objective optical system;
   receiving said first and second light distributions with a light-receiving element having first and second ranges each provided with a plurality of picture elements, and providing output signals from said light-receiving element;
   calculating a preliminary value by the use of one of a plurality of different calculations, each of which calculates a value indicative of the focus adjusted state of said objective optical system by the use of the output signals obtained in said light-receiving step;
   evaluating each of said different calculations using said preliminary value and selecting one of said different calculations in accordance with the evaluation; and
   outputting the value calculated in the selected calculation as a value indicative of the focus adjusted state of said objective optical system.

7. A method according to claim 6, wherein the step of evaluating each of said different calculations includes the step of inclining a function of each of said different calculations in a vicinity of said preliminary value.

8. A method according to claim 6, wherein one of said different calculations includes the step of selecting one of the output signals regarding said first light distribution and an output signal regarding said second light distribution which is greater in magnitude, and wherein another one of said different calculations includes the step of selecting one of the two selected signals which is smaller in magnitude, and wherein said one different calculation and said another different calculation both include the step of relatively varying the picture elements of said first and second ranges.

* * * * *

UNITED STATES PATENT AND TRADEMARK OFFICE
CERTIFICATE OF CORRECTION

PATENT NO. : 4,800,410
DATED : January 24, 1989
INVENTOR(S) : Akashi, et al.

It is certified that error appears in the above-identified patent and that said Letters Patent is hereby corrected as shown below:

COLUMN 1
Line 27, change "detected" to --detected.--.

COLUMN 12
Line 26, delete "up".

COLUMN 13
Line 13, change "opera,ted" to --operated--.

COLUMN 14
Line 38, change "valve" to --value--.

COLUMN 15
Line 12, change "distrubutions" to --distributions--.

Signed and Sealed this

Twenty-sixth Day of September, 1989

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,800,410

DATED : January 24, 1989

INVENTOR(S) : Akira Akashi, et al.

It is certified that error appears in the above-identified patent and that said Letters Patent is hereby corrected as shown below: Title page:

[57] ABSTRACT:

Line 8, change "values" to --value--.

COLUMN 5:

Line 29, change "th" to --the--.

Signed and Sealed this

Seventeenth Day of April, 1990

Attest:

HARRY F. MANBECK, JR.

*Attesting Officer*   *Commissioner of Patents and Trademarks*